(12) United States Patent
Poteet (10) Patent No.: US 12,319,622 B2
(45) Date of Patent: *Jun. 3, 2025

(54) OXIDATION PROTECTION OF COMPOSITES

(71) Applicant: GOODRICH CORPORATION, Charlotte, NC (US)

(72) Inventor: Steven Poteet, Irvine, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/747,816

(22) Filed: May 18, 2022

(65) Prior Publication Data

US 2023/0373868 A1  Nov. 23, 2023

(51) Int. Cl.
| | | |
|---|---|---|
| *B32B 15/04* | (2006.01) | |
| *B32B 17/06* | (2006.01) | |
| *C04B 35/14* | (2006.01) | |
| *C04B 35/563* | (2006.01) | |
| *C04B 35/565* | (2006.01) | |
| *C04B 35/58* | (2006.01) | |
| *C04B 35/5831* | (2006.01) | |

(52) U.S. Cl.
CPC .......... *C04B 35/5831* (2013.01); *C04B 35/14* (2013.01); *C04B 35/563* (2013.01); *C04B 35/565* (2013.01); *C04B 35/58085* (2013.01)

(58) Field of Classification Search
CPC .......................... C04B 35/5831; C04B 35/565
USPC .................................................. 428/427, 428
See application file for complete search history.

(56) References Cited

U.S. PATENT DOCUMENTS

| | | |
|---|---|---|
| 2,685,539 A | 8/1954 | Woodburn, Jr. et al. |
| 2,685,540 A | 8/1954 | Woodburn, Jr. et al. |
| 2,685,541 A | 8/1954 | Woodburn, Jr. et al. |
| 2,685,542 A | 8/1954 | Woodburn, Jr. et al. |
| 2,989,153 A | 6/1961 | Boulet et al. |
| 3,342,627 A | 9/1967 | Paxton et al. |
| 3,510,347 A | 5/1970 | Strater |
| 3,692,150 A | 9/1972 | Ruppe, Jr. |

(Continued)

FOREIGN PATENT DOCUMENTS

| | | |
|---|---|---|
| CN | 1046517 | 10/1990 |
| CN | 101233341 | 7/2008 |

(Continued)

OTHER PUBLICATIONS

USPTO; Non-Final Office Action dated Jun. 18, 2024 in U.S. Appl. No. 17/308,776.

(Continued)

*Primary Examiner* — Lauren R Colgan
(74) *Attorney, Agent, or Firm* — SNELL & WILMER L.L.P.

(57) ABSTRACT

Systems and methods for forming an oxidation protection system on a composite structure are provided. In various embodiments, the oxidation protection system comprises a boron-glass layer formed on the composite substrate and a silicon-glass layer formed over the boron-glass layer. Each of the boron-glass layer and the silicon-glass layer include a glass former and a glass modifier. The boron-glass layer includes a boron compound comprising a mixture of boron carbide ($B_4C$) powder and cubic boron nitride (BN) powder.

20 Claims, 2 Drawing Sheets

(56) References Cited

U.S. PATENT DOCUMENTS

| | | |
|---|---|---|
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,330,572 A | 5/1982 | Frosch et al. |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,567,103 A | 1/1986 | Sara |
| 4,599,256 A | 7/1986 | Vasilos |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,808,558 A | 2/1989 | Park et al. |
| 4,837,073 A | 6/1989 | McAllister et al. |
| 4,863,001 A | 9/1989 | Edmisten |
| 1,892,790 A | 1/1990 | Gray |
| 4,958,998 A | 9/1990 | Yamauchi et al. |
| 4,960,817 A | 10/1990 | Spadafora |
| 5,073,454 A | 12/1991 | Graham |
| 5,077,130 A | 12/1991 | Okuyama et al. |
| 5,094,901 A | 3/1992 | Gray |
| 5,102,698 A | 4/1992 | Cavalier et al. |
| 5,153,070 A | 10/1992 | Andrus et al. |
| 5,179,048 A | 1/1993 | Niebylski et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,352,494 A | 10/1994 | Rousseau |
| 5,360,638 A | 11/1994 | Lequertier |
| 5,401,440 A | 3/1995 | Stover et al. |
| 5,427,823 A | 6/1995 | Varshney et al. |
| 5,439,080 A | 8/1995 | Haneda et al. |
| 5,480,676 A | 1/1996 | Sonuparlak et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,856,015 A | 1/1999 | Buchanan |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geriner |
| 5,965,266 A | 10/1999 | Goujard et al. |
| 5,971,113 A | 10/1999 | Kesavan et al. |
| 5,981,072 A | 11/1999 | Mercuri et al. |
| 6,016,450 A | 1/2000 | Corck |
| 6,036,762 A | 3/2000 | Sambasivan |
| 6,071,603 A | 6/2000 | Sakai et al. |
| 6,071,615 A | 6/2000 | Solow et al. |
| 6,225,248 B1 | 5/2001 | Leiser et al. |
| 6,228,453 B1 | 5/2001 | Fareed et al. |
| 6,256,187 B1 | 7/2001 | Matsunaga et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,632,762 B1 | 10/2003 | Zaykoski et al. |
| 6,668,984 B2 | 12/2003 | Gray |
| 6,676,887 B2 | 1/2004 | Lafdi |
| 6,737,120 B1 | 5/2004 | Golecki |
| 6,740,408 B2 | 5/2004 | Thebault |
| 6,759,117 B2 | 7/2004 | Bauer et al. |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,160,618 B2 | 1/2007 | Walker et al. |
| 7,311,944 B2 | 12/2007 | Sambasivan et al. |
| 7,501,181 B2 | 3/2009 | Walker et al. |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Mazany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,137,802 B1 | 3/2012 | Loehman et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,388,087 B2 | 7/2016 | Don |
| 9,657,409 B2 | 5/2017 | Sandgren et al. |
| 9,758,678 B2 | 9/2017 | Nicolaus et al. |
| 9,790,133 B2 | 10/2017 | Mazany |
| 10,508,206 B2 | 12/2019 | Poteet |
| 10,526,253 B2 | 1/2020 | Poteet |
| 10,767,059 B2 | 9/2020 | Poteet |
| 10,941,486 B2 | 3/2021 | Mazany |
| 11,001,533 B2 | 5/2021 | Mazany et al. |
| 11,046,619 B2 | 6/2021 | Poteet |
| 11,072,565 B2 | 7/2021 | Weaver et al. |
| 11,091,402 B2 | 8/2021 | Poteet |
| 11,634,213 B2 * | 4/2023 | Poteet ................ C04B 41/5035 427/419.7 |
| 2002/0058576 A1 | 5/2002 | Mazany et al. |
| 2002/0096407 A1 | 7/2002 | Gray |
| 2002/0123592 A1 | 9/2002 | Zhang et al. |
| 2003/0021975 A1 | 1/2003 | Martin |
| 2003/0143436 A1 | 7/2003 | Forsythe et al. |
| 2003/0194574 A1 | 10/2003 | Thebault et al. |
| 2004/0038032 A1 * | 2/2004 | Walker .................... C04B 41/89 428/408 |
| 2004/0038043 A1 | 2/2004 | Golecki et al. |
| 2004/0062009 A1 | 4/2004 | Osanai et al. |
| 2004/0213906 A1 | 10/2004 | Mazany et al. |
| 2005/0022698 A1 | 2/2005 | Mazany et al. |
| 2005/0127146 A1 | 6/2005 | Chaumat et al. |
| 2006/0159909 A1 | 7/2006 | Aslan et al. |
| 2007/0026153 A1 | 2/2007 | Nicolaus et al. |
| 2007/0154712 A1 * | 7/2007 | Mazany ................ C04B 41/009 428/408 |
| 2008/0058193 A1 | 3/2008 | Drake et al. |
| 2008/0142148 A1 | 6/2008 | Mazany |
| 2008/0311301 A1 | 12/2008 | Diss et al. |
| 2010/0044730 A1 | 2/2010 | Kwon et al. |
| 2010/0266770 A1 * | 10/2010 | Mazany .................. C04B 41/52 427/372.2 |
| 2011/0311804 A1 * | 12/2011 | Diss ........................ F02K 9/974 428/448 |
| 2012/0025434 A1 | 2/2012 | Demey et al. |
| 2013/0022826 A1 | 1/2013 | Kmetz |
| 2014/0196502 A1 | 7/2014 | Masuda |
| 2014/0227511 A1 | 8/2014 | Mazany |
| 2014/0349016 A1 | 11/2014 | Don |
| 2015/0183998 A1 | 7/2015 | Belov et al. |

(56) References Cited

U.S. PATENT DOCUMENTS

| | | | |
|---|---|---|---|
| 2015/0291805 A1 | 10/2015 | Nicolaus et al. | |
| 2015/0362029 A1 | 12/2015 | Edwards et al. | |
| 2016/0122231 A1 | 5/2016 | Ishihara | |
| 2016/0280585 A1* | 9/2016 | Mazany | C03C 8/08 |
| 2016/0280612 A1 | 9/2016 | Mazany | |
| 2017/0036945 A1 | 2/2017 | Ishihara | |
| 2017/0267595 A1 | 9/2017 | Mazany | |
| 2017/0342555 A1 | 11/2017 | Mazany | |
| 2017/0349825 A1 | 12/2017 | Mazany | |
| 2017/0369713 A1 | 12/2017 | Poteet | |
| 2017/0369714 A1* | 12/2017 | Nicolaus | C04B 41/5042 |
| 2018/0044537 A1* | 2/2018 | Poteet | B05D 1/28 |
| 2019/0055393 A1 | 2/2019 | Tsuji | |
| 2019/0233324 A1* | 8/2019 | Poteet | C04B 41/009 |
| 2020/0148340 A1* | 5/2020 | Poteet | C04B 41/5062 |
| 2020/0347240 A1* | 11/2020 | Poteet | C09D 5/084 |
| 2021/0087102 A1 | 3/2021 | Simard et al. | |
| 2021/0094887 A1* | 4/2021 | Poteet | C04B 41/009 |
| 2021/0198159 A1* | 7/2021 | Poteet | C04B 41/52 |
| 2023/0150884 A1 | 5/2023 | Khan et al. | |
| 2023/0219859 A1* | 7/2023 | Nable | C04B 41/5022 |
| | | | 106/14.05 |
| 2023/0257313 A1* | 8/2023 | Nable | C04B 35/83 |
| | | | 428/408 |
| 2024/0318695 A1* | 9/2024 | Ding | C04B 41/507 |
| 2024/0391835 A1 | 11/2024 | Khan et al. | |

FOREIGN PATENT DOCUMENTS

| | | |
|---|---|---|
| CN | 101328077 | 12/2008 |
| CN | 101898906 | 12/2010 |
| CN | 102515850 | 6/2012 |
| CN | 101712563 | 9/2012 |
| CN | 103274760 | 9/2013 |
| CN | 105237039 | 1/2016 |
| CN | 105646007 | 4/2018 |
| CN | 107935634 | 4/2018 |
| CN | 107986807 | 10/2020 |
| CN | 113831155 | 12/2021 |
| DE | 69830510 | 3/2006 |
| EP | 200568 | 11/1986 |
| EP | 0677499 | 10/1995 |
| EP | 1043290 | 10/2000 |
| EP | 1693262 | 8/2006 |
| EP | 1834937 | 9/2007 |
| EP | 1840264 | 10/2007 |
| EP | 1968914 | 7/2010 |
| EP | 2684752 | 1/2014 |
| EP | 2767529 | 8/2014 |
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3255027 | 12/2017 |
| EP | 3282038 | 2/2018 |
| EP | 3184228 | 7/2019 |
| EP | 3530637 | 8/2019 |
| EP | 3590910 | 1/2020 |
| EP | 3702342 | 9/2020 |
| EP | 3842404 | 6/2021 |
| EP | 4086234 | 11/2022 |
| EP | 4227286 | 8/2023 |
| EP | 4279472 | 11/2023 |
| GB | 2468378 | 9/2010 |
| JP | 56105442 | 8/1981 |
| JP | S6011353 A | 1/1985 |
| JP | H0812477 | 1/1996 |
| JP | H 09301786 | 11/1997 |
| JP | 2006036551 | 2/2006 |
| KR | 20050022947 | 3/2005 |
| KR | 20090035732 | 4/2009 |
| WO | WO 9742135 | 11/1997 |
| WO | WO 0051950 | 9/2000 |
| WO | WO03084899 | 10/2003 |
| WO | WO 2007078419 | 7/2007 |
| WO | WO2010001021 | 1/2010 |
| WO | WO 2014035413 | 3/2014 |
| WO | WO 2015169024 | 11/2015 |

OTHER PUBLICATIONS

International Searching Authority, International Search Report and Written Opinion dated Apr. 20, 2005 in Application No. PCT/US2004/012222.

International Searching Authority, International Preliminary Report on Patentability dated Aug. 18, 2005 in Application No. PCT/US2004/012222.

International Searching Authority, International Search Report and Written Opinion dated Jul. 3, 2007 in Application No. PCT/US2006/043343.

European Patent Office, Office Action dated Jan. 4, 2008 in Application No. 04816727.4.

USPTO, Office Action dated Feb. 26, 2008 in U.S. Appl. No. 10/829,144.

International Searching Authority, International Preliminary Report on Patentability dated Mar. 12, 2008 in Application No. PCT/US2006/043343.

USPTO, Final Office Action dated Jul. 16, 2008 in U.S. Appl. No. 10/829,144.

USPTO, Office Action dated Oct. 24, 2008 in U.S. Appl. No. 10/829,144.

European Patent Office, Communication Pursuant to Article 94(3) EPC dated Oct. 28, 2008 in European Application No. 06837063.4.

USPTO, Restriction Requirement dated Feb. 5, 2009 in U.S. Appl. No. 11/315,592.

USPTO, Final Office Action dated Jan. 29, 2009 in U.S. Appl. No. 10/829,144.

European Patent Office, Communication Pursuant to Article 94(3) EPC dated Feb. 9, 2009 in European Application No. 06837063.4.

USPTO, Office Action dated May 29, 2009 in U.S. Appl. No. 10/829,144.

USPTO, Office Action dated Jun. 9, 2009 in U.S. Appl. No. 11/315,592.

USPTO, Notice of Allowance dated Oct. 1, 2009 in U.S. Appl. No. 10/829,144.

USPTO, Final Office Action dated Dec. 11, 2009 in U.S. Appl. No. 11/315,592.

European Patent Office, Communication under Rule 71(3) EPC dated Feb. 4, 2010 in European Application No. 06837063.4.

USPTO, Advisory Action dated Feb. 25, 2010 in U.S. Appl. No. 11/315,592.

USPTO, Office Action dated Apr. 1, 2010 in U.S. Appl. No. 11/315,592.

European Patent Office, Partial European Search Report dated Oct. 29, 2010 in European Application No. 10169627.6.

USPTO, Office Action dated Feb. 4, 2011 in U.S. Appl. No. 12/619,061.

USPTO, Office Action dated Feb. 22, 2011 in U.S. Appl. No. 12/829,178.

European Patent Office, Extended European Search Report dated May 4, 2011 in European Application No. 10169627.6.

USPTO, Final Office Action dated Aug. 19, 2011 in U.S. Appl. No. 12/829,178.

USPTO, Advisory Action dated Oct. 27, 2011 in U.S. Appl. No. 12/829,178.

U.S. Appl. No. 15/076,348, filed Mar. 21, 2016 titled "High Temperature Oxidation Protection for Composites," 42 pages.

U.S. Appl. No. 15/169,219, filed May 31, 2016 titled "High Temperature Oxidation Protection for Composites," 37 pages.

U.S. Appl. No. 15/174,537, filed Jun. 6, 2016 titled "Nanocomposite Coatings for Oxidation Protection for Composites," 44 pages.

U.S. Appl. No. 15/194,034, filed Jun. 27, 2016 titled "High Temperature Oxidation Protection for Composites," 49 pages.

U.S. Appl. No. 15/169,257, filed May 31, 2016 titled "High Temperature Oxidation Protection for Composites," 40 pages.

(56) References Cited

OTHER PUBLICATIONS

U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
European Patent Office, Extended European Search Report dated Jul. 26, 2016 in European Application No. 16161832.7.
USPTO, Restriction Requirement dated Nov. 7, 2016 in U.S. Appl. No. 14/671,637.
USPTO, Pre-Interview First Office Action dated Mar. 6, 2017 in U.S. Appl. No. 14/671,637.
USPTO, First Action Interview Office Action dated May 12, 2017 in U.S. Appl. No. 14/671,637.
USPTO, Restriction Requirement dated Jan. 5, 2018 in U.S. Appl. No. 15/076,348.
European Patent Office, Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
European Patent Office, Extended European Search Report dated Oct. 9, 2017 in European Application No. 17173709.1.
European Patent Office, Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2, The Lithium Company.
D.D.L. Chung: "Acid Aluminum Phosphate for the Binding and Coating of Materials", Journal of Materials Science, vol. 38, No. 13, 2003, pp. 2785-2791.
European Patent Office, Extended European Search Report dated Nov. 6, 2017 in European Application No. 17174481.6.
USPTO, Final Office Action dated Jan. 17, 2018 in U.S. Appl. No. 14/671,637.
European Patent Office, Communication Pursuant to Article 94(3) dated Jan. 3, 2018 in European Application No. 16161832.7.
European Patent Office, Extended European Search Report dated Nov. 20, 2017 in European Application No. 17175809.7.
European Patent Office, Extended European Search Report dated Nov. 20, 2017 in European Application No. 17178011.7.
European Patent Office, Partial European Search Report dated Jan. 3, 2018 in European Application No. 17183478.1.
USPTO, Advisory Action dated Mar. 30, 2018 in U.S. Appl. No. 14/671,637.
USPTO, Non-Final Office Action dated May 1, 2018 in U.S. Appl. No. 15/076,348.
USPTO, Restriction/Election Requirement dated May 24, 2018 in U.S. Appl. No. 15/174,537.
USPTO, Non-Final Office Action dated Mar. 28, 2018 in U.S. Appl. No. 15/234,903.
European Patent Office, European Search Report dated Apr. 11, 2018 in European Application No. 17183478.1-1103.
European Patent Office, European Search Report dated Apr. 13, 2018 in European Application No. 17207767.9-1106.
USPTO, Restriction/Election Requirement dated Jun. 19, 2018 in U.S. Appl. No. 15/194,034.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
USPTO, Non-Final Office Action dated Jul. 27, 2018 in U.S. Appl. No. 15/174,537.
Steven A. Poteet, et al., U.S. Appl. No. 16/029,134, filed Jul. 6, 2018 titled "High Temperature Oxidation Protection for Composites," 43 pages.
Steven A. Poteet, et al., U.S. Appl. No. 15/886,671, filed Feb. 1, 2018 titled "High Temperature Oxidation Protection for Composites," 45 pages.
European Patent Office, European Office Action date Jul. 16, 2018 in Application No. 17174481.6.
Steven A. Poteet, U.S. Appl. No. 16/102,100, filed Aug. 13, 2018 titled "High Temperature Oxidation Protection for Composites," 47 pages.
USPTO, Notice of Allowance dated Aug. 24, 2018 in U.S. Appl. No. 14/671,637.
Anthony Mazany, U.S. Appl. No. 16/116,665, filed Aug. 29, 2018 titled "Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Final Office Action dated Oct. 26, 2018 in U.S. Appl. No. 15/234,903.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites", 38 pages.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, Non-Final Office Action dated Apr. 16, 2019 in U.S. Appl. No. 15/076,348.
USPTO, Notice of Allowance dated Apr. 3, 2019 in U.S. Appl. No. 15/169,257.
USPTO, Advisory Action dated May 17, 2019 in U.S. Appl. No. 15/174,537.
USPTO, Final Office Action dated May 15, 2019 in U.S. Appl. No. 15/194,034.
USPTO, Restriction/Election Requirement dated Apr. 5, 2019 in U.S. Appl. No. 15/380,442.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action date Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
European Patent Office, Communication pursuant to Article 94(3) dated Aug. 28, 2019 in Application No. 17173707.5.
USPTO, Final Office Action filed Aug. 30, 2019 in U.S. Appl. No. 15/234,903.

(56) References Cited

OTHER PUBLICATIONS

The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites," 45 pages.
USPTO, Advisory Action filed Nov. 20, 2019 in U.S. Appl. No. 15/234,903.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.
USPTO, Notice of Allowance dated Feb. 21, 2020 in U.S. Appl. No. 16/116,665.
European Patent Office, European Search Report dated Mar. 23, 2020 in Application No. 19207148.8.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Notice of Allowance filed May 1, 2020 in U.S. Appl. No. 15/234,903.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
USPTO, Restriction/Election Requirement filed Jul. 14, 2020 in U.S. Appl. No. 16/102,100.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
European Patent Office, European Office Action dated Oct. 22, 2020 in Application No. 17173709.1.
USPTO, Advisory Action dated Nov. 17, 2020 in U.S. Appl. No. 15/886,671.
USPTO, Non-Final Office Action filed Nov. 17, 2020 in U.S. Appl. No. 16/102,100.
USPTO, Notice of Allowance dated Dec. 7, 2020 in U.S. Appl. No. 16/589,368.
European Patent Office, European Office Action dated Nov. 19, 2020 in Application No. 17178011.7.
USPTO, Notice of Allowance dated Jan. 1, 2021 in U.S. Appl. No. 16/453,593.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
USPTO, Supplemental Notice of Allowance dated Mar. 2, 2021 in U.S. Appl. No. 16/453,593.
USPTO, Notice of Allowance dated Mar. 8, 2021 in U.S. Appl. No. 16/102,100.
USPTO, Decision on Appeal dated Apr. 5, 2021 in U.S. Appl. No. 15/076,348.
USPTO, Advisory Action dated Apr. 7, 2021 in U.S. Appl. No. 16/666,809.
USPTO, Notice of Allowance dated Apr. 15, 2021 in U.S. Appl. No. 16/668,852.
U.S. Appl. No. 17/308,776, filed May 5, 2021 titled "High Temperature Oxidation Protection for Carbon-Carbon Composites," 41 pages.
European Patent Office, European Search Report dated May 10, 2021 in Application No. 20216996.7.
USPTO, Corrected Notice of Allowance dated Jun. 4, 2021 in U.S. Appl. No. 16/102,100.
European Patent Office, European Office Action dated Jul. 7, 2021 in Application No. 17183478.1.
USPTO, Corrected Notice of Allowance dated Jun. 11, 2021 in U.S. Appl. No. 16/668,852.
USPTO, Notice of Allowance dated Jul. 12, 2021 in U.S. Appl. No. 16/666,809.
European Patent Office, European Office Action dated Oct. 22, 2021 in Application No. 19191306.0.
USPTO, Non-Final Office Action dated Nov. 18, 2021 in U.S. Appl. No. 15/076,348.
USPTO, Restriction/Election Requirement dated Dec. 1, 2021 in U.S. Appl. No. 16/190,817.
USPTO, Notice of Allowance dated Feb. 1, 2022 in U.S. Appl. No. 17/185,016.
U.S. Appl. No. 17/527,423, filed Nov. 16, 2021 entitled "High Temperature Oxidation Protection for Carbon-Carbon Composites," 41 pages.
USPTO, Supplemental Notice of Allowance dated Feb. 24, 2022 in U.S. Appl. No. 17/185,016.
USPTO, Pre-Interview First Office Action dated Mar. 21, 2022 in U.S. Appl. No. 16/029,134.
USPTO, Pre-Interview Office Action dated Mar. 1, 2022, in U.S. Appl. No. 16/190,817.
Eckel, Zak C., et al. "Additive Manufacturing of Polymer-derived Ceramics". Science 351, (2016), vol. 351, p. 58-62. DOI: 10.1126/science.aad2688.
USPTO, First Action Interview Office Action dated May 9, 2022 in U.S. Appl. No. 16/029,134.
USPTO, Notice of Allowance dated May 25, 2022 in U.S. Appl. No. 17/330,163.
USPTO, Notice of Allowance dated Jul. 8, 2022 in U.S. Appl. No. 17/330,163.
USPTO, Notice of Allowance dated Jun. 29, 2022 in U.S. Appl. No. 17/378,207.
USPTO, First Action Interview Office Action dated Jun. 30, 2022 in U.S. Appl. No. 16/190,817.
USPTO, Corrected Notice of Allowance dated Jul. 19, 2022 in U.S. Appl. No. 17/378,207.
USPTO, Final Office Action dated Aug. 22, 2022 in U.S. Appl. No. 16/029,134.
USPTO, Corrected Notice of Allowance dated Aug. 31, 2022 in U.S. Appl. No. 17/330,163.
European Patent Office, European Search Report dated Sep. 23, 2022 in Application No. 22171665.7.
USPTO, Corrected Notice of Allowance dated Oct. 17, 2022 in U.S. Appl. No. 17/378,207.
European Patent Office, European Search Report dated Aug. 27, 2024 in Application No. 24164939.1.
European Patent Office, European Search Report dated Sep. 4, 2024 in Application No. 24164789.0.
USPTO; Advisory Action dated Sep. 5, 2024 in U.S. Appl. No. 17/671,361.
Tsung-Ming et al.: "On the Oxidation Kinetics and Mechanisms of Various SiC-Coated Carbon-Carbon Composites", Carbon, Elsevier Oxford, GB, vol. 29, No. 8, 1991, pp. 1257-1265, XP024029999, ISSN: 0008-6223, DOI: 10.1016/ 0008-6223(91)90045-K.
USPTO; Advisory Action dated Apr. 26, 2024 in U.S. Appl. No. 17/079,239.
USPTO; Notice of Allowance dated Apr. 19, 2024 in U.S. Appl. No. 17/527,423.
USPTO, Notice of Allowance dated Dec. 21, 2022 in U.S. Appl. No. 16/190,817.
USPTO, Advisory Action dated Nov. 1, 2022 in U.S. Appl. No. 16/029,134.

(56) References Cited

OTHER PUBLICATIONS

European Patent Office, European Office Action dated Aug. 18, 2022 in Application No. 17183478.1.
European Patent Office, European Office Action dated Nov. 24, 2022 in Application No. 19184523.9.
European Patent Office, European Office Action dated Jan. 26, 2023 in Application No. 19207148.8.
European Patent Office, European Office Action dated Sep. 1, 2023 in Application No. 19184523.9.
European Patent Office, European Search Report dated Sep. 22, 2023 in Application No. 23173619.0.
Pechentkovskaya L. E. et al, "Effect of the different crystal structures of boron nitride on its high-temperature stability in oxygen", Soviet Powder Metallurgy and Metal Ceramics, [Online] vol. 20, No. 7, Jul. 1981 (Jul. 1981), pp. 510-512, DOI: 10.1007/BF00800535, Retrieved from the Internet: url: https://link.springer.com/article/10.1007/BF00800535, [retrieved on Sep. 13, 2023].
USPTO, Final Office Action dated Sep. 28, 2023 in U.S. Appl. No. 17/671,361.
USPTO, Examiner's Answer to Appeal Brief dated Sep. 7, 2023 in U.S. Appl. No. 16/029,134.
USPTO, Final Office Action dated Jan. 25, 2024 in U.S. Appl. No. 17/079,239.
USPTO, Non-Final Office Action dated Jan. 16, 2024 in U.S. Appl. No. 17/527,423.
USPTO, Non-Final Office Action dated Feb. 1, 2024 in U.S. Appl. No. 17/671,361.
European Patent Office, European Office Action dated Aug. 27, 2024 in Application No. 1919130601014.
European Patent Office, European Search Report dated Aug. 27, 2024 in Application No. 24163857.6.
USPTO; Requirement for Restriction/ Election dated Oct. 10, 2024 in U.S. Appl. No. 17/571,083.
USPTO, Corrected Notice of Allowance dated Mar. 1, 2023 in U.S. Appl. No. 16/190,817.
European Patent Office, European Office Action dated Feb. 17, 2023 in Application No. 1718011.7.
USPTO, Requirement for Restriction dated Apr. 26, 2023 in U.S. Appl. No. 17/079,239.
USPTO, Non-Final Office Action dated Mar. 30, 2023 in U.S. Appl. No. 17/671,361.
European Patent Office, European Search Report dated Apr. 12, 2023 in Application No. 22207343.9.
European Patent Office, European Search Report dated May 23, 2023 in Application No. 23150808.6.
Chemical Abstracts, (Aug. 12, 1985), vol. 103, ISSN 0009-2258, XP000189303 [A] 1-15 * abstract *.
Buchanan F J, et al. "Particulate-containing glass sealents for carbon-carbon composites" Carbon, Elsevier Oxford, GB, vol. 33, No. 4, 1995, pp. 491-497.
USPTO, Non-Final Office Action dated Jul. 13, 2023 in U.S. Appl. No. 17/079,239.
European Patent Office, European Search Report dated Jul. 7, 2023 in Application No. 23156560.7.
European Patent Office, European Search Report dated Nov. 20, 2023 in Application No. 23179864.6.
Liu et al: "Effect of $Al_2O_3$ addition on the microstructure and oxidation behavior of SiC coating prepared by pack cementation on C/C composites", Ceramics International, Elsevier, Amsterdam, NL, vol. 47, No. 20, Jul. 13, 2021 (Jul. 13, 2021), pp. 29309-29319, XP086762324, ISSN: 0272-8842, DOI: 10.1016/J.CERAMINT.2021.07.096 [retrieved on Jul. 13, 2021].
USPTO, Restriction/Election Requirement dated Dec. 15, 2023 in U.S. Appl. No. 17/308,776.
USPTO, Advisory Action dated Dec. 8, 2023 in U.S. Appl. No. 17/671,361.
USPTO; Non-Final Office Action dated May 21, 2024 in U.S. Appl. No. 17/079,239.
USPTO; Final Office Action dated Jun. 27, 2024 in U.S. Appl. No. 17/671,361.
USPTO; Non-Final Office Action dated Nov. 18, 2024 in U.S. Appl. No. 17/671,361.
USPTO; Notice of Allowance dated Dec. 3, 2024 in U.S. Appl. No. 17/079,239.
USPTO; Non-Final Office Action dated Dec. 17, 2024 in U.S. Appl. No. 17/571,083.
USPTO; Non-Final Office Action dated Jan. 21, 2025 in U.S. Appl. No. 18/765,864.
USPTO; Non-Final Office Action dated Feb. 20, 2025, in U.S. Appl. No. 18/186,821.
USPTO; Notice of Allowance dated Mar. 12, 2025 in U.S. Appl. No. 17/571,083.
USPTO; Notice of Allowance dated Mar. 3, 2025 in U.S. Appl. No. 17/571,083.
USPTO; Notice of Allowance dated Mar. 7, 2025 in U.S. Appl. No. 17/308,776.

* cited by examiner

OXIDATION PROTECTION OF COMPOSITES

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at high temperature operating conditions, which include temperatures of 900° C. (1652° F.) or greater. Oxidation protection systems including layers of boron carbide and silicon carbide may reduce infiltration of oxygen and oxidation catalysts into the composite structure. However, such oxidation protection systems may exhibit hydrolytic instability, as boron oxide ($B_2O_3$), which may be formed during operation of the component at increased temperatures, is water soluble.

SUMMARY

A method for forming an oxidation protection system on a carbon-carbon composite structure is disclosed herein. In accordance with various embodiments, the method may comprise applying a first pretreating composition to an outer surface of the carbon-carbon composite structure, heating the pretreating composition, and applying a second pretreating composition on the first pretreating composition. The carbon-carbon composite structure is porous and the second pretreating composition penetrates a pore of the composite structure. The method further includes applying a boron slurry to the carbon-carbon composite structure, applying a silicon slurry to the carbon-carbon composite structure, and heating the carbon-carbon composite structure. The boron slurry may comprise a boron compound, a first glass compound, a first glass former, a first glass modifier, and a first carrier fluid. The boron compound includes a mixture of boron carbide ($B_4C$) powder and boron nitride (BN) powder. The silicon slurry may comprise a silicon compound, a second glass compound, a second glass former, a second glass modifier, and a second carrier fluid.

In various embodiments, the first glass modifier may comprise at least one of a first alkaline earth metal compound, a first zirconium compound, or a first aluminum compound, and the second glass modifier may comprise at least one of a second alkaline earth metal compound, a second zirconium compound, or a second aluminum compound.

In various embodiments, the first glass modifier may include at least one of calcium boride (CaB2), calcium oxide (CaO), calcium carbonate (Ca(CO3)2, magnesium boride (MgB2), magnesium oxide (MgO), magnesium carbonate (Mg(CO3)2, zirconium boride (ZrB2), zirconium oxide (ZrO), zirconium carbonate (Zr(CO3)2, or aluminum oxide ($Al_2O_3$) The second glass modifier may include at least one of calcium boride (CaB2), calcium oxide (CaO), calcium carbonate (Ca(CO3)2, magnesium boride (MgB2), magnesium oxide (MgO), magnesium carbonate (Mg(CO3)2, zirconium boride (ZrB2), zirconium oxide (ZrO), zirconium carbonate (Zr(CO3)2, or aluminum oxide (AlO3).

In various embodiments, the first pretreating composition comprises aluminum oxide and water, and the second pretreating composition comprises an aluminum salt and at least one of a phosphoric acid or an acid phosphate salt.

In various embodiments, each of the first glass former and the second glass former may comprise colloidal silica.

In various embodiments, the boron compound may comprise a mixture of boron carbide powder and boron nitride powder.

In various embodiments, the boron nitride powder may form a greater weight percentage of the boron slurry than the boron carbide powder.

In various embodiments, each of the first glass and the second glass may comprise borosilicate glass.

An oxidation protection system disposed on an outer surface of a substrate is also disclosed herein. In accordance with various embodiments, the oxidation protection system may comprise a boron-glass layer disposed over the outer surface and a silicon-glass layer disposed on the boron-glass layer. The boron-glass layer may comprise a boron compound, a first glass compound, a first glass former, and a first glass modifier. The boron compound includes a mixture of boron carbide ($B_4C$) powder and boron nitride (BN) powder. The silicon-glass layer may comprise a silicon compound, a second glass compound, a second glass former, and a second glass modifier.

In various embodiments, at least one of the first glass compound or the second glass compound may comprise borosilicate glass, the boron compound may comprise a mixture of boron carbide powder and boron nitride powder, and the silicon compound may comprise at least one of silicon carbide, a silicide compound, silicon, silicon dioxide, or silicon carbonitride.

In various embodiments, the first glass modifier may include at least one of calcium boride (CaB2), calcium oxide (CaO), calcium carbonate (Ca(CO3)2, magnesium boride (MgB2), magnesium oxide (MgO), magnesium carbonate (Mg(CO3)2, zirconium boride (ZrB2), zirconium oxide (ZrO), zirconium carbonate (Zr(CO3)2, or aluminum oxide ($Al_2O_3$) The second glass modifier may include at least one of calcium boride (CaB2), calcium oxide (CaO), calcium carbonate (Ca(CO3)2, magnesium boride (MgB2), magnesium oxide (MgO), magnesium carbonate (Mg(CO3)2, zirconium boride (ZrB2), zirconium oxide (ZrO), zirconium carbonate (Zr(CO3)2, or aluminum oxide (AlO3).

In various embodiments, the cubic boron nitride powder forms a greater weight percentage of the boron slurry than the boron carbide powder.

In various embodiments, at least one of the boron-glass layer or the silicon-glass layer may include monoaluminium phosphate. In various embodiments, the first glass modifier may comprise aluminum oxide, and the second glass modifier may comprise zirconium boride.

A method for forming an oxidation protection system on a brake disk is also disclosed herein. In accordance with various embodiments, the method may comprise applying a first pretreating composition to an outer surface of a non-wear surface of the brake disk. The first pretreating composition may comprise aluminum oxide and water. The method further includes heating the pretreating composition. The method further includes applying a second pretreating composition comprising an aluminum salt and at least one of a phosphoric acid or an acid phosphate salt on the first pretreating composition. The composite structure is porous and the second pretreating composition penetrates a pore of the composite structure. The method further includes forming a boron slurry by mixing a boron compound, a first glass compound, a first glass former, a first glass modifier, and a first carrier fluid. The boron compound comprises a mixture of boron carbide ($B_4C$) powder and cubic boron nitride (BN) powder. The method further includes applying the boron slurry over the non-wear surface of the brake disk. The method further includes forming a silicon slurry by mixing a silicon compound, a second glass compound, a second glass former, a second glass modifier, and a second carrier fluid, and applying the silicon slurry over the non-wear surface of the brake disk; and heating the brake disk at a first temperature.

In various embodiments, the method may further comprise drying the brake disk after applying the boron slurry to remove the first carrier fluid. In various embodiments, the method may further comprise drying the brake disk after applying the silicon slurry to remove the second carrier fluid.

In various embodiments, drying the brake disk after applying the silicon slurry may comprises heating the brake disk at a second temperature less than the first temperature.

In various embodiments, the first glass modifier may include at least one of calcium boride ($CaB_2$), calcium oxide (CaO), calcium carbonate ($Ca(CO3)2$, magnesium boride ($MgB_2$), magnesium oxide (MgO), magnesium carbonate ($Mg(CO3)2$), zirconium boride ($ZrB_2$), zirconium oxide (ZrO), zirconium carbonate ($Zr(CO3)2$, or aluminum oxide (AlO3). The second glass modifier may include at least one of calcium boride ($CaB_2$), calcium oxide (CaO), calcium carbonate ($Ca(CO3)2$, magnesium boride ($MgB_2$), magnesium oxide (MgO), magnesium carbonate ($Mg(CO3)2$, zirconium boride ($ZrB_2$), zirconium oxide (ZrO), zirconium carbonate ($Zr(CO3)2$, or aluminum oxide ($Al_2O_3$).

In various embodiments, the first glass former and the second glass former may each comprise colloidal silica.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
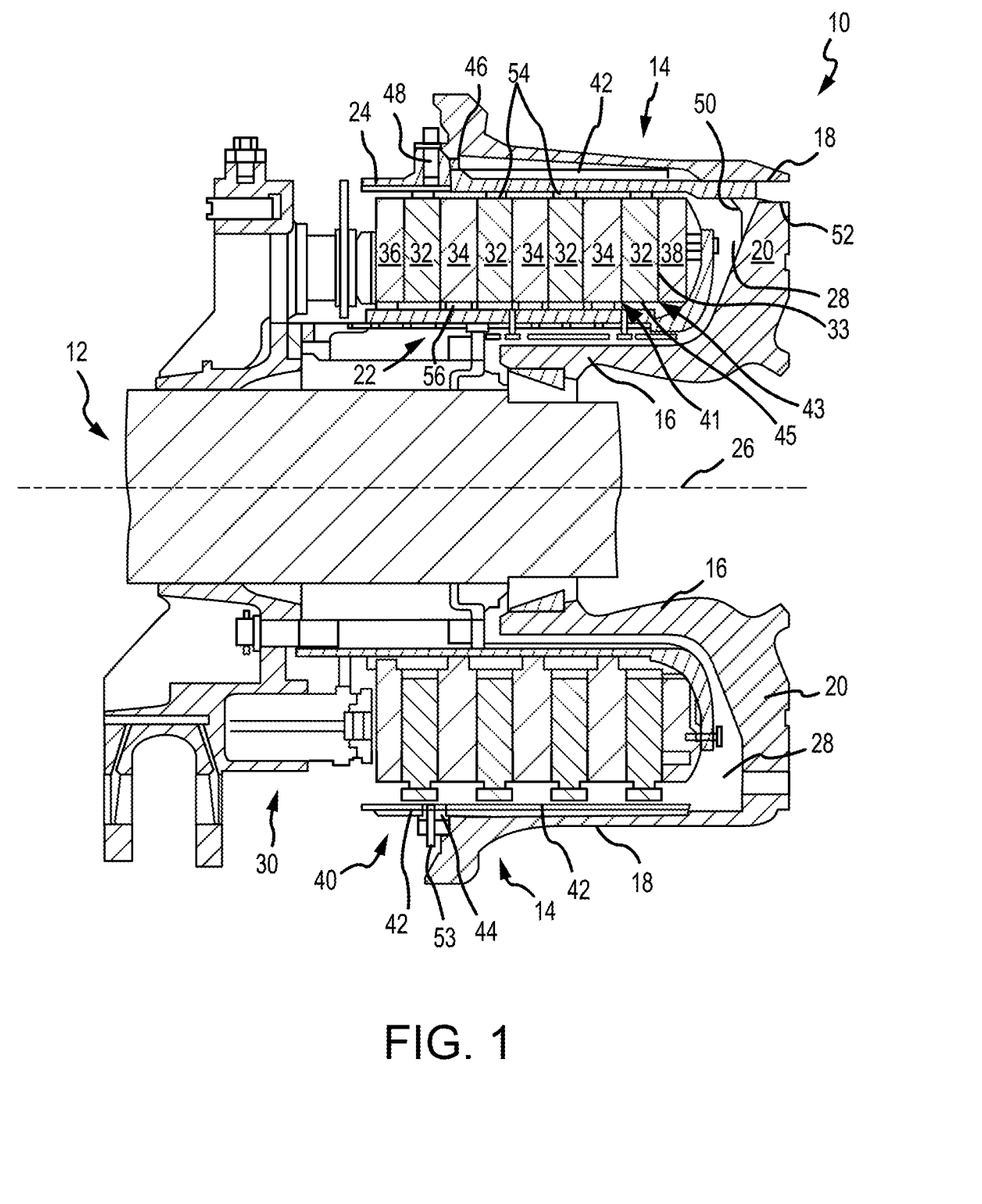
FIG. 1 illustrates a cross sectional view of an aircraft wheel braking assembly, in accordance with various embodiments.

With initial reference to FIG. 1, aircraft wheel brake assembly 10 such as may be found on an aircraft, in accordance with various embodiments is illustrated. Aircraft wheel brake assembly may, for example, comprise a bogie axle 12, a wheel including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite axial ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

The friction disks (e.g., rotors 32, stators 34, pressure plate 36, end plate 38) may be formed of carbon-carbon (C/C) composites having carbon fibers disposed in a carbon matrix). The C/C composites may operate as heat sinks to absorb large amounts of kinetic energy converted to heat during slowing of the aircraft. Heat shield 40 may reflect thermal energy away from wheel well 18 and back toward rotors 32 and stators 34.

In various embodiments, brake disks of aircraft wheel brake assembly 10 may reach operating temperatures in the range from about 100° C. (212° F.) up to about 900° C. (1652° F.), or higher (e.g., 1093° C. (2000° F.)). The high temperatures experienced by aircraft wheel braking assembly 10 can lead to loss of C/C composite material due to oxidation of carbon. For example, various C/C composite components of aircraft wheel braking assembly 10 may experience both catalytic oxidation and inherent thermal oxidation caused by heating the composite during operation. In various embodiments, rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because C/C composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the C/C composite.

Elements identified in severely oxidized regions of C/C composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of C/C composite aircraft brakes, including the substrate and any reaction-formed porous barrier coating. When such contamination occurs, the rate of carbon loss by oxidation can be increased by one to two orders of magnitude.

In various embodiments, an oxidation protection system, as disclosed herein, may be applied to the various components of aircraft wheel brake assembly 10 for protecting the components from oxidation. However, it will be recognized that the oxidation protection systems and methods of forming the same, as disclosed herein, may be readily adapted to many parts in this and other brake assemblies, as well as to other C/C composite structures susceptible to oxidation losses from infiltration of atmospheric oxygen and/or catalytic contaminants.

Figure 2:
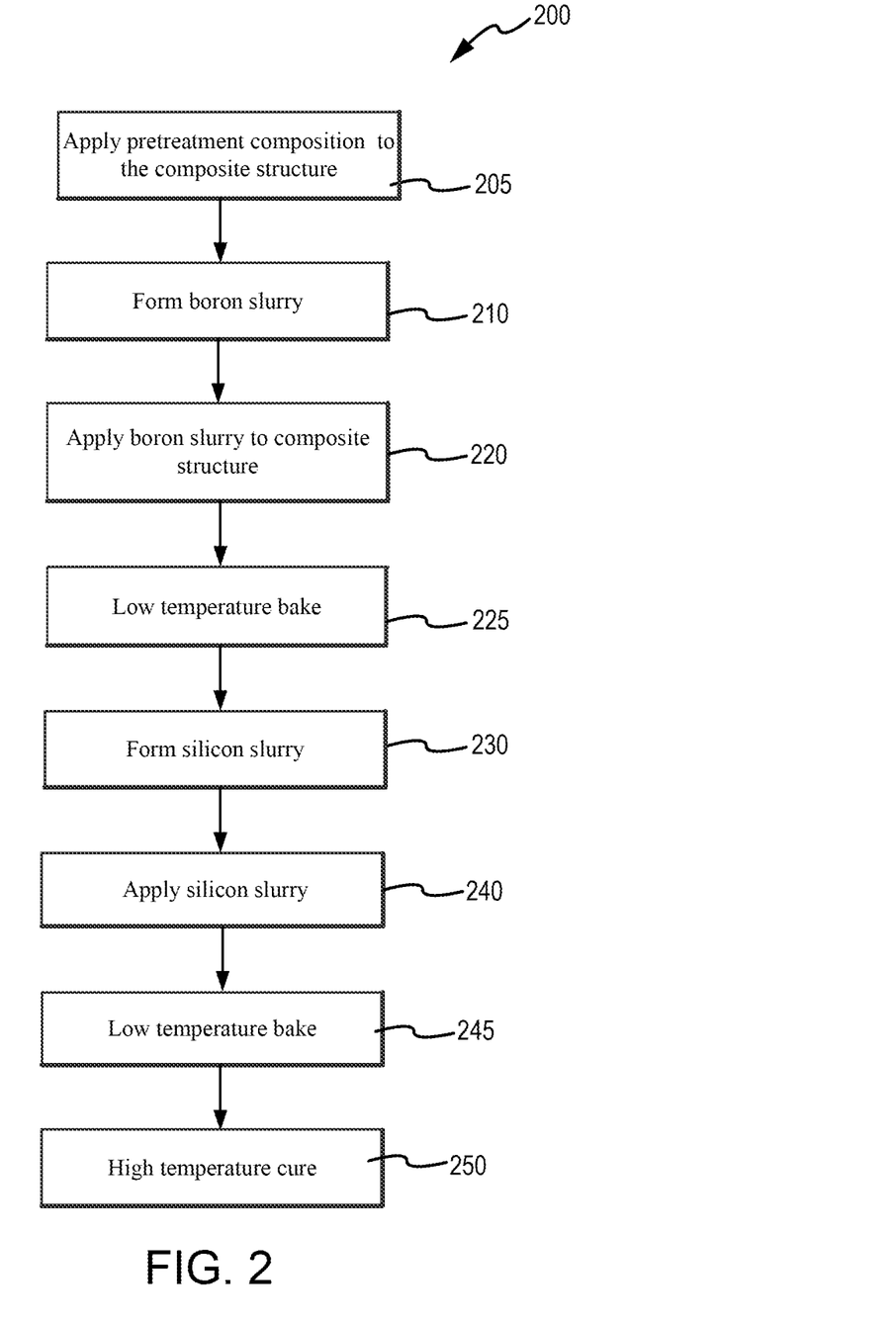
FIG. 2 illustrates a method for forming an oxidation protection system on a composite structure, in accordance with various embodiments.

In various embodiments, a method for limiting an oxidation reaction in a substrate (e.g., a C/C composite structure) may comprise forming an oxidation protection system on the composite structure. With reference to FIG. 2, a method 200 for forming an oxidation protection system on a composite structure is illustrated. In accordance with various embodiments, method 200 may, for example, comprise applying an oxidation inhibiting composition to non-wear surfaces of C/C composite brake components, such as non-wear surfaces 45 and/or lugs 54. Non-wear surface 45, as labeled in FIG. 1, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including slots 56, as well as an outer diameter (OD) surface of rotors 32 including lugs 54. Method 200 may be performed on densified C/C composites. In this regard, method 200 may be performed after carbonization and densification of the C/C composite.

In various embodiments, method 200 may comprise forming a boron slurry (step 210). The boron slurry may be formed by combining a boron compound, a glass compound, a silica ($SiO_2$) glass former, and a glass modifier with a carrier fluid (such as, for example, water). In various embodiments, the boron compound may comprise at least one boron-comprising refractory material (e.g., ceramic material). In various embodiments, the boron compound may comprise boron carbide, titanium diboride, boron nitride, zirconium boride, silicon hexaboride, elemental boron, and/or mixtures thereof.

In various embodiments, the boron slurry may comprise from about 3% to about 30% by weight boron compound, from about 5% to about 20% by weight boron compound, or from about 7% to about 18% by weight boron compound. As used in previous context only, the term "about" means ±1.0 weight percent. In various embodiments, the boron slurry may comprise approximately 7.4% by weight boron compound. As used in this context only, the term "approximately" means ±0.50 weight percent. In various embodiments, the boron slurry may comprise approximately 16.7% by weight boron compound. As used in this context only, the term "approximately" means ±0.50 weight percent. In various embodiments, the boron slurry may comprise approximately 16.4% by weight boron compound. As used in this context only, the term "approximately" means ±0.50 weight percent.

In various embodiments, the boron compound comprises a mixture of boron carbide ($B_4C$) powder and boron nitride (BN) powder. In various embodiments, the boron nitride powder is comprised of cubic boron nitride (c-BN) powder. The space group of c-BN is a zinc blende structure wherein the atoms form two interpenetrating face-centered cubic (FCC) latices. Cubic boron nitride may oxidize at a slower rate as compared to other boron compounds, such as hexagonal boron nitride, boron carbide, titanium boride, zirconium boride, calcium hexaboride, and others. By having a mixture of boron compounds with different oxidation rates, controlled oxidation at high temperatures in air may be established while having a replenishing boron source. Boron compounds are known to oxidize in high temperature environments, forming boron oxide, which liquefies and protects against further oxidation; however, inefficient conversion with $SiO2$ to form borosilicates can result in susceptibility to humid or wet environments, where the boron oxide may be lost as boric acid. Cubic boron nitride also provides a source of low CTE within the formulation nearest the carbon composite, reducing the formation of crack propagation during thermal events. In various embodiments, the boron nitride powder forms a greater weight percentage of the boron slurry as compared to the weight percentage formed by the boron carbide powder. In various embodiments, the boron carbide powder may form between about 1.0% and about 10.0% of the weight percentage of the boron slurry, and the boron nitride powder may form between about 5.0% and about 20.0% of the weight percentage of the boron slurry. In various embodiments, the boron carbide powder may form between about 1.0% and about 10.0% of the volume percentage of the boron slurry, and the boron nitride powder may form between about 5.0% and about 30.0% of the volume percentage of the boron slurry. As used in previous context only, the term "about" means ±1.0 weight percent. In various embodiments, the boron carbide powder may form between about 4.0% and about 6.0% of the weight percentage of the boron slurry, and the boron nitride powder may form between about 10.0% and about 13.0% of the weight percentage of the boron slurry. As used in previous context only, the term "about" means ±1.0 weight percent. In various embodiments, the boron carbide powder may form between about 1% and about 2.5% of the weight percentage of the boron slurry, and the boron nitride powder may form between about 4.5% and about 6.5% of the weight percentage of the boron slurry. As used in this context only, the term "about" means ±1.0 weight percent.

In various embodiments, the boron compound is a powder (e.g., boron carbide powder, boron nitride powder, etc.). The boron compound powder may comprise particles having an average particle size of between about 100 nm and about 100 μm, between about 500 nm and about 50 μm, between about 1 μm and about 20 μm, between about 5 μm and about 10 μm, and/or between about 500 nm and about 1 μm. As used in the previous context only, the term "about" means ±10% of the associated value. In various embodiments, the boron compound powder may comprise particles having an average particle size of approximately 0.7 μm. As used in the previous context only, the term "approximately" means ±0.25 μm. In various embodiments, the boron compound powder may comprise particles having an average particle size of approximately 9.3 μm. As used in the previous context only, the term "approximately" means ±0.25 μm.

The glass compound of the boron slurry may comprise borosilicate glass, borophosphate, quartz, aluminosilicate, boroaluminosilicate, and/or any other suitable glass compound. The glass compound may be in the form of a glass frit or other pulverized form. In various embodiments, the glass compound is borosilicate glass. In various embodiments, the borosilicate glass may comprise in weight percentage 13% $B_2O_3$, 61% $SiO_2$, 2% $Al_2O_3$, and 4% sodium oxide ($Na_2O$), and may have a CTE of $3.3 \times 10^{-6}$ cm/C, a working point of 2286° F. (1252° C.), and an annealing point of 1040° F. (560° C.). In various embodiments, the boron slurry may comprise between about 5.0% and about 50.0% by weight glass compound, between about 10.0% and about 35.0% by weight glass compound, between about 24.0% and about 26.0% by weight glass compound, or between about 27.0% and about 29.0% by weight glass compound. As used in previous context only, the term "about" means ±1.0 weight percent. In various embodiments, the glass compound may form approximately 25.0% of the weight percentage of the boron slurry. As used in the previous context only, the term "approximately" means ±0.50 weight percent.

In various embodiments, the silica glass former may include colloidal silica, metal silicates, alkyl silicates, and/or amorphous or crystalline silica. In various embodiments, the silica glass former is a colloidal silica suspension having 40.0% by weight silica. In various embodiments, the silica glass former may be silicon (Si) powder. The silica glass former may form between about 10.0% and about 40.0%, between about 20.0% and about 30.0%, or between about 24.0% and about 28.0% of the weight percentage of the boron slurry. As used the previous context only, the term "about" means ±1.0 weight percent. In various embodiments, the silica glass former may form approximately 25.0% of the weight percentage of the boron slurry. As used the previous context only, the term "approximately" means ±0.5 weight percent.

In various embodiments, the boron slurry may also comprise a glass modifier. The glass modifier may include an alkaline earth metal compound such as, for example, calcium boride ($CaB_2$), calcium oxide (CaO), calcium carbonate ($Ca(CO_3)_2$), magnesium boride ($MgB_2$), magnesium oxide (MgO), magnesium carbonate ($Mg(CO_3)_2$), a zirconium compound such as, for example, zirconium boride ($ZrB_2$), zirconium oxide (ZrO), zirconium carbonate ($Zr(CO_3)_2$), and/or an aluminum compound such as aluminum oxide ($Al_2O_3$). The glass modifier reacts with the borosilicate glass and refractory oxides that may form during oxidation, thereby resulting in a more stable and/or denser glass ceramic coating at associated temperature range. In various embodiments, the glass modifier may form between about 0.5% and about 10.0%, between about 1.0% and about 5.0%, between about 3.0% and about 4.0%, or between about 1.0% and about 2.0% of the weight percentage of the boron slurry.

In various embodiments, the boron slurry may also comprise monoaluminium phosphate. The monoaluminium phosphate may be in the form of a solution (e.g., monoaluminium phosphate and a carrier fluid) of any suitable make-up. In various embodiments, the monoaluminium phosphate solution may comprise about 50% by weight monoaluminium phosphate and about 50% by weight carrier fluid (e.g., water). In the previous context only, the term "about" means ±10.0 weight percent. In various embodiments, the monoaluminium phosphate solution may form between about 1.0% and about 10.0%, between about 2.0% and about 5.0%, or between about 3.0% and about 4.0% of the weight percentage of the boron slurry. As used the previous context only, the term "about" means ±1.0 weight percent.

In various embodiments, the boron slurry may comprise, in weight percentage, about 5.0% boron carbide powder, about 12.0% boron nitride powder, about 25.0% borosilicate glass, about 3.0% monoaluminium phosphate solution, about 25.0% colloidal silica suspension, about 2.0% aluminum oxide, and about 28.0% water. As used the previous context only, the term "about" means ±1.0 weight percent. The borosilicate glass may comprise in weight percentage 13.0% $B_2O_3$, 61.0% $SiO_2$, 2.0% $Al_2O_3$, and 4.0% $Na_2O$, and may have a CTE of $3.3 \times 10^{-6}$ cm/C, a working point of 2286° F. (1252° C.), and an annealing point of 1040° F. (560° C.). The colloidal silica suspension may be 40% by weight silica. The monoaluminium phosphate solution may be 50% by weight monoaluminium phosphate and 50% by weight carrier fluid. The colloidal silica suspension may be 40% by weight silica.

In various embodiments, the boron slurry may comprise, in weight percentage, about 2.0% boron carbide powder, about 6.0% boron nitride powder, about 28.0% borosilicate glass, about 4.0% monoaluminium phosphate solution, about 28.0% colloidal silica suspension, about 2.0% aluminum oxide, and about 31.0% water. As used the previous context only, the term "about" means ±1.0 weight percent. The borosilicate glass may comprise in weight percentage 13.0% $B_2O_3$, 61.0% $SiO_2$, 2.0% $Al_2O_3$, and 4.0% $Na_2O$, and may have a CTE of $3.3 \times 10^{-6}$ cm/C, a working point of 2286° F. (1252° C.), and an annealing point of 1040° F. (560° C.). The colloidal silica suspension may be 40% by weight silica. The monoaluminium phosphate solution may be 50% by weight monoaluminium phosphate and 50% by weight carrier fluid. The colloidal silica suspension may be 40% by weight silica.

In various embodiments, the boron slurry may comprise, in weight percentage, about 5.0% boron carbide powder, about 12.0% boron nitride powder, about 25.0% borosilicate glass, about 3.0% monoaluminium phosphate solution, about 25.0% colloidal silica suspension, about 3.0% calcium carbonate, and about 28.0% water. As used the previous context only, the term "about" means ±1.0 weight percent. The borosilicate glass may comprise in weight percentage 13.0% $B_2O_3$, 61.0% $SiO_2$, 2.0% $Al_2O_3$, and 4.0% $Na_2O$, and may have a CTE of $3.3 \times 10^{-6}$ cm/C, a working point of 2286° F. (1252° C.), and an annealing point of 1040° F. (560° C.). The colloidal silica suspension may be 40% by weight silica. The monoaluminium phosphate solution may be 50% by weight monoaluminium phosphate and 50% by weight carrier fluid. The colloidal silica suspension may be 40% by weight silica.

In accordance with various embodiments, method 200 further comprises applying the boron slurry to a composite structure (step 220). Applying the boron slurry may comprise, for example, spraying or brushing the boron slurry to an outer surface of the composite structure. Any suitable manner of applying the boron slurry to the composite structure is within the scope of the present disclosure. As referenced herein, the composite structure may refer to a C/C composite structure. In accordance with various embodiments, the boron slurry may be applied directly on (i.e., in physical contact with) the surface of the composite structure.

With continued reference to FIG. 2, in various embodiments, method 200 may further include drying the composite structure after applying the boron slurry (step 225). Step 225 may be performed prior to applying the silicon slurry (i.e., prior to step 240). Step 225 may include heating the composite structure at a relatively low temperature (for example, a temperature of between about 150° F. (66° C.) and about 500° F. (260° C.), or of about 400° F. (204° C.)) to remove the carrier fluid of the boron slurry. In the previous context only, the term "about" means ±25° F. (4° C.)). Step 225 may include heating the composite structure for about 5 minutes to about 8 hours, about 10 minutes to about 2 hours, or about 20 minutes, wherein the term "about" in this context only means ±10% of the associated value.

In various embodiments, method 200 may comprise forming a silicon slurry (step 230) by combining a silicon compound, a glass compound, a silica glass former compound, and a glass modifier with a carrier fluid (such as, for example, water). In various embodiments, the silicon compound may comprise at least one silicon-comprising refractory material (e.g., ceramic material). In various embodiments, the silicon compound may comprise silicon carbide, a silicide compound, silicon, silicon dioxide, silicon carbonitride, or combinations thereof.

In various embodiments, the silicon slurry may comprise from about 5.0% to about 30.0% by weight silicon compound, from about 10.0% to about 20.0% by weight silicon compound, from about 9.0% to about 11.0% by weight silicon compound, or from about 18.0% to about 20.0% by weight silicon compound. As used in previous context only, the term "about" means ±1.0 weight percent.

In various embodiments, the silicon compound is a powder (e.g., silicon powder or silicon carbide powder). The silicon compound powder may comprise particles having an average particle size of between about 100 nm and 50 μm, between 500 nm and 20 μm, between 500 nm and 1.5 μm, or between 16 μm and 18 μm. As used in previous context only, the term "about" means ±1.0 μm. In various embodiments, the silicon compound may comprise particles having an average particle size of approximately 17 μm. As used in the previous context only, the term "about" means ±0.25 μm. In various embodiments, the silicon compound may comprise particles having an average particle size of approximately 1.0 μm. As used in the previous context only, the term "about" means ±0.25 μm.

The glass compound of the silicon slurry may comprise borosilicate glass, borophosphate, quartz, aluminosilicate, boroaluminosilicate, and/or any other suitable glass compound. The glass compound may be in the form of a glass frit or other pulverized form. In various embodiments, the glass compound is borosilicate glass. In various embodiments, the borosilicate glass may comprise in weight percentage 13% $B_2O_3$, 61% $SiO_2$, 2% $Al_2O_3$, and 4% $Na_2O$, and may have a CTE of $3.3\times10^{-6}$ cm/C, a working point of 2286° F. (1252° C.), and an annealing point of 1040° F. (560° C.). In various embodiments, the silicon slurry may comprise between about 5.0% and about 50.0% by weight glass compound, between about 10.0% and about 30.0% by weight glass compound, between about 22% and about 24% by weight glass compound, or between about 24.0% and about 26.0% by weight glass compound. As used in previous context only, the term "about" means ±1.0 weight percent.

In various embodiments, the silica glass former may include colloidal silica, metal silicates, alkyl silicates, and/or elemental silica. In various embodiments, the silica glass former is a colloidal silica suspension having 40.0% by weight silica. In various embodiments, the silica glass former may be silicon powder. The silica glass former may form between about 10.0% and about 40.0%, between about 20.0% and about 30.0%, between about 22% and about 24.0%, or between about 24.0% and 26.0% of the weight percentage of the silicon slurry. As used the previous context only, the term "about" means ±1.0 weight percent.

In various embodiments, the silicon slurry may also comprise monoaluminium phosphate. The monoaluminium phosphate may be in the form of a solution (e.g., monoaluminium phosphate and a carrier fluid) of any suitable make-up. In various embodiments, the monoaluminium phosphate solution may comprise about 50% by weight monoaluminium phosphate and about 50% by weight carrier fluid (e.g., water). In the previous context only, the term "about" means ±10 weight percent. In various embodiments, the monoaluminium phosphate solution may form between about 1% and about 10%, between about 2% and about 5%, or between about 3% and about 4% of the weight percentage of the silicon slurry. As used the previous context only, the term "about" means ±1.0 weight percent.

In various embodiments, the silicon slurry may also comprise a glass modifier. The glass modifier may include an alkaline earth metal compound such as, for example, calcium boride ($CaB_2$), calcium oxide (CaO), calcium carbonate ($Ca(CO_3)_2$), magnesium boride ($MgB_2$), magnesium oxide (MgO), magnesium carbonate ($Mg(CO_3)_2$), a zirconium compound such as, for example, zirconium boride ($ZrB_2$), zirconium oxide (ZrO), zirconium carbonate ($Zr(CO_3)_2$), and/or an aluminum compound such as aluminum oxide ($Al_2O_3$). The glass modifier reacts with the borosilicate glass and refractory oxides that may form during oxidation, thereby resulting in a more stable and/or denser glass ceramic coating at associated temperature range. In various embodiments, the glass modifier may form between about 1.0% and about 15.0%, between about 3.0% and about 10.0%, or between about 5.0% and about 7.0% of the weight percentage of the silicon slurry. As used the previous context only, the term "about" means ±1.0 weight percent.

In various embodiments, the silicon slurry may comprise, in weight percentage, about 19.0% silicon carbide powder, about 23.0% borosilicate glass, about 3.0% monoaluminium phosphate solution, about 23.0% colloidal silica suspension, about 6.0% zirconium boride, and about 27.0% water. As used the previous context only, the term "about" means ±1.0 weight percent. The borosilicate glass may comprise in weight percentage 13% $B_2O_3$, 61% $SiO_2$, 2% $Al_2O_3$, and 4% $Na_2O$, and may have a CTE of $3.3\times10^{-6}$ cm/C, a working point of 2286° F. (1252° C.), and an annealing point of 1040° F. (560° C.). The colloidal silica suspension may be 40% by weight silica. The monoaluminium phosphate solution may be 50% by weight monoaluminium phosphate and 50% by weight carrier fluid.

In various embodiments, the silicon slurry may comprise, in weight percentage, about 10.0% silicon carbide powder, about 25.0% borosilicate glass, about 3.0% monoaluminium phosphate solution, about 25.0% colloidal silica suspension, about 7.0% zirconium boride, and about 29.0% water. As used the previous context only, the term "about" means ±1.0 weight percent. The borosilicate glass may comprise in weight percentage 13% $B_2O_3$, 61% $SiO_2$, 2% $Al_2O_3$, and 4% $Na_2O$, and may have a CTE of $3.3\times10^{-6}$ cm/C, a working point of 2286° F. (1252° C.), and an annealing point of 1040° F. (560° C.). The colloidal silica suspension may be 40% by weight silica. The monoaluminium phosphate solution may be 50% by weight monoaluminium phosphate and 50% by weight carrier fluid.

In various embodiments, the silicon slurry may comprise, in weight percentage, about 18.0% silicon carbide powder, about 23.0% borosilicate glass, about 3.0% monoaluminium phosphate solution, about 23.0% colloidal silica suspension, about 7.0% zirconium boride, and about 26.0% water. As used the previous context only, the term "about" means ±1.0 weight percent. The borosilicate glass may comprise in weight percentage 13% $B_2O_3$, 61% $SiO_2$, 2% $Al_2O_3$, and 4% $Na_2O$, and may have a CTE of $3.3 \times 10^{-6}$ cm/C, a working point of 2286° F. (1252° C.), and an annealing point of 1040° F. (560° C.). The colloidal silica suspension may be 40% by weight silica. The monoaluminium phosphate solution may be 50% by weight monoaluminium phosphate and 50% by weight carrier fluid.

In various embodiments, method 200 further comprises applying the silicon slurry to the composite structure (step 240). Applying the silicon slurry may comprise, for example, spraying or brushing the silicon slurry over the surface on which the boron slurry was applied (e.g., the silicon slurry is applied over the boron slurry). Any suitable manner of applying the silicon slurry to the composite structure is within the scope of the present disclosure. As referenced herein, the composite structure may refer to a C/C composite structure.

In various embodiments, method 200 may further comprise drying the composite structure after applying the silicon slurry (step 245). Step 245 may include heating the composite structure at a relatively low temperature (for example, a temperature of between about 150° F. (66° C.) and about 500° F. (260° C.), or of about 200° F. (93° C.) to remove the carrier fluid of the silicon slurry. Step 245 may include heating the composite structure for about 5 minutes to about 8 hours, about 10 minutes to about 2 hours, or about 10 minutes, wherein the term "about" in this context only means ±10% of the associated value.

In various embodiments, method 200 may further comprise performing a high temperature cure (step 250) to form a boron-glass layer on the composite structure and a silicon-glass layer on the boron-glass layer. Step 250 may include heating the composite structure at a relatively high temperature, for example, a temperature of between 1200° F. (649° C.) to about 2000° F. (1093° C.), between about 1500° F. (816° C.) to about 1700° F. (927° C.), or about 1650° F. (899° C.), wherein the term "about" in previous context only means ±25° F. (±4° C.)). Step 250 may include heating the composite structure for about 5 minutes to about 8 hours, about 30 minutes to about 5 hours, or about 2 hours, wherein the term "about" in this context only means ±10% of the associated value. In various embodiments, step 250 may be performed in an inert environment, such as under a blanket of inert or less reactive gas (e.g., nitrogen ($N_2$), argon, other noble gases, and the like). The temperature rise may be controlled at a rate that removes water without boiling and provides temperature uniformity throughout the composite structure.

In various embodiments method 200, may further comprise applying at least one of a pretreating composition or a barrier coating (step 205) prior to applying the first slurry. Step 205 may, for example, comprise applying a first pretreating composition to an outer surface of a composite structure, such as a component of aircraft wheel braking assembly 10. In various embodiments, the first pretreating composition comprises an aluminum oxide in water. For example, the aluminum oxide may comprise an additive, such as a nanoparticle dispersion of aluminum oxide (for example, NanoBYK-3600® sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition, the component may be heated to remove water and fix the aluminum oxide in place. For example, the component may be heated between about 100° C. (212° F.) and 200° C. (392° F.), and further, between 100° C. (212° F.) and 150° C. (302° F.).

In various embodiments, the pretreatment composition may comprise monoaluminium phosphate. The monoaluminium phosphate may be in the form of a solution (e.g., monoaluminium phosphate and a carrier fluid) of any suitable make-up. In various embodiments, the monoaluminium phosphate solution may comprise about 50% by weight monoaluminium phosphate and about 50% by weight carrier fluid (e.g., water). In the previous context only, the term "about" means ±10 weight percent. In various embodiments, after applying the pretreatment composition, the composite structure is heated to remove carrier fluid and fix the monoaluminium phosphate over the composite structure. In accordance with various embodiments, method 300 may include applying the boron slurry (step 220) after heating the composite structure to remove the carrier fluid (e.g., water) of the pretreatment composition.

Step 205 may further comprise applying a second pretreating composition. In various embodiments, the second pretreating composition comprises a phosphoric acid and an aluminum phosphate, aluminum hydroxide, and/or aluminum oxide. The second pretreating composition may further comprise, for example, a second metal salt such as a magnesium salt. In various embodiments, the aluminum to phosphorus molar ratio of the aluminum phosphate is 1 to 3 or less by weight. Further, the second pretreating composition may also comprise a surfactant or a wetting agent. In various embodiments, the second pretreating composition is applied to the composite structure atop the first pretreating composition. The composite structure may then, for example, be heated. In various embodiments, the composite structure may be heated between about 600° C. (1112° F.) and about 800° C. (1472° F.), and further, between about 650° C. (1202° F.) and 750° C. (1382° F.).

Not to be bound by theory, it is believed that boron components may become oxidized during service at high temperatures (e.g., temperatures greater than 1300° F. (704° C.)), thereby forming boron oxide. The boron oxide may come into contact with the silica glass former or oxidized silicon components to form a borosilicate in situ, providing a method of self-healing. For a boron-silicon oxidation protection system, the probability of boron oxide reacting with oxidized silicon compounds is kinetically controlled and influenced by the amount of each component, surface area, aspect ratio, etc. Boron oxide is also volatile, especially when hydrated to form boric acid, and may be lost during extended service time. Method 200 tends to increase the probability of self-healing borosilicate formation by creating a layer of silicon, glass, and glass former over the boron-glass layer that can reduce boron oxide transportation in water prior to volatilization. For instance, by adding cubic boron nitride, which oxidizes slower much slower than other boron compounds below 1000 C, the amount of the boron oxide production may be reduced. A balance of the cubic boron nitride along with the boron carbide is needed to get both good oxidation protection and stability in water. Boron compounds are known to oxidize in high temperature environments, forming boron oxide, which liquefies and protects against further oxidation; however, inefficient conversion with SiO2 to form borosilicates can result in susceptibility to humid or wet environments, where the boron oxide may be lost as boric acid. Cubic boron nitride also provides a source of low CTE within the formulation nearest the carbon composite, reducing the formation of crack propagation during thermal events. The silica glass former in the boron-glass layer and in the silicon-glass layer may also react with the boron oxide forming, for example, borosilicate glass, laminboard glass, borophosphate glass, etc. in the boron-glass and/or silicon-glass layers. The silica reacting with the boron oxide, tends to decrease or eliminate unreacted boron oxide, thereby increasing the water stability of the oxidation protection system.

TABLE 1 illustrates a first oxidation protection system (OPS) A, a second OPS B, a third OPS C, a fourth OPS D, and a fifth OPS E formed in accordance with the methods and compositions disclosed herein. Each of OPS A through performed much better at oxidation until monoaluminum phosphate (MALP) pretreatment was added as the first layer prior to the boron layer. Likewise, those that had high c-BN:B4C performed much better at water stability as indicated in the P1200 data. Comparing P1200 to P1200+H2O, the latter was exposed to moisture during the test. The larger the difference between P1200 and P1200+H2O within the same formulation indicates larger instability. As the amount of c-BN was increased, the formulation was stabilized to water but at the expense of oxidation until monoaluminum phosphate (MALP) was added as the pretreatment. Accordingly, better results in terms of oxidation and water stability may be achieved.

TABLE 1

| Slurry Components | OPS A | OPS B | OPS C | OPS D | OPS E | OPS D |
|---|---|---|---|---|---|---|
| Boron Slurry | (g) | (g) | (g) | (g) | (g) | (g) |
| Boron Carbide ($B_4C$) | 7.954 | 6.893 | 5.303 | 4.242 | 3.182 | 1.500 |
| Cubic Boron Nitride (BN) | 2.652 | 3.712 | 5.303 | 6.364 | 7.424 | 3.500 |
| Water | 16.667 | 16.667 | 16.667 | 16.667 | 16.667 | 18.000 |
| BSG 7740 | 6.452 | 6.452 | 6.452 | 6.452 | 6.452 | 7.500 |
| MALP | 3.000 | 3.000 | 2.000 | 2.000 | 2.000 | 0.000 |
| BYK 3620 | 1.000 | 1.000 | 1.000 | 1.000 | 1.000 | 0.000 |
| Ludox AS-40 | 0.000 | 0.000 | 0.000 | 0.000 | 0.000 | 7.000 |
| Silicon Slurry | (g) | (g) | (g) | (g) | (g) | (g) |
| Silicon Carbide (SiC) | 12.500 | 12.500 | 12.500 | 12.500 | 12.500 | 6.000 |
| Water | 17.500 | 17.500 | 17.500 | 17.500 | 17.500 | 18.000 |
| BSG 7740 | 15.000 | 15.000 | 15.000 | 15.000 | 15.000 | 7.000 |
| Ludox AS-40 | 0.000 | 0.000 | 0.000 | 0.000 | 0.000 | 7.000 |

TABLE 2

| | P1200 MALP + OPS C | P1200 + H2O MALP + OPS C (H2O) | P1200 MALP + OPS D | P1200 + H2O MALP + OPS D (H2O) | P1200 MALP + OPS E | P1200 + H20 MALP + OPS E (H2O) |
|---|---|---|---|---|---|---|
| Weight loss at 0 hr @ 1200° F. | 0.00% | 0.00% | 0.00% | 0.00% | 0.00% | 0.00% |
| Weight loss at 4 hr @ 1200° F. | 0.08% | 0.11% | 0.05% | 0.04% | 0.06% | 0.05% |
| Weight loss at 5 hr @ 1800° F. | −0.01% | 0.08% | 0.03% | 0.01% | 0.13% | 0.10% |
| Weight loss at 8 hr @ 1200° F. | 0.16% | 2.60% | 0.36% | 3.09% | 0.30% | 1.29% |
| Weight loss at 12 hr @ 1200° F. | 0.46% | 3.71% | 0.91% | 100.00% | 0.70% | 1.99% |

OPS E is formed by applying a boron slurry including a glass former (e.g., colloidal silica) and a silicon slurry including a glass former (e.g., colloidal silica) to a C/C composite. Each numerical value in TABLE 1 is the weight in grams of the component in the respective slurry. BSG 7740 is a borosilicate glass comprising 13% $B_2O_3$, 61% $SiO_2$, 2% $Al_2O_3$, and 4% $Na_2O$. BYK is a colloidal silica. The monoaluminium phosphate (MALP) is a solution of 50% by weight monoaluminium phosphate and 50% by weight water. The ratio of cBN:B4C incorporated into a borosilicate glass, along with other constituents, helps optimize (i.e., control) the rate of boron oxidation, where cBN is slower to oxidize and has a lower CTE, while B4C is quicker to oxidize. The ratio creates a balance between oxidation and water stability performance without degrading the other.

TABLE 2 illustrates an example test data. For instance, testing determined that formulations with low c-BN:B4C Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oxidation protection system disposed on an outer surface of a substrate, the oxidation protection system, comprising:
   a boron-glass layer disposed over the outer surface, the boron-glass layer comprising a boron compound, a first glass compound, a first glass former, and a first glass modifier, wherein the boron compound comprises a mixture of boron carbide powder and cubic boron nitride powder; and
   a silicon-glass layer disposed on the boron-glass layer, the silicon-glass layer comprising a silicon compound, a second glass compound, a second glass former, and a second glass modifier.

2. The oxidation protection system of claim 1, wherein at least one of the first glass compound or the second glass compound comprises borosilicate glass, and wherein the silicon compound comprises at least one of silicon carbide, a silicide compound, silicon, silicon dioxide, or silicon carbonitride.

3. The oxidation protection system of claim 2, wherein the first glass modifier includes at least one of calcium boride, calcium oxide, calcium carbonate, magnesium boride, magnesium oxide, magnesium carbonate, zirconium boride, zirconium oxide, zirconium carbonate, or aluminum oxide, and wherein the second glass modifier includes at least one of calcium boride, calcium oxide, calcium carbonate, magnesium boride, magnesium oxide, magnesium carbonate, zirconium boride, zirconium oxide, zirconium carbonate, or aluminum oxide.

4. The oxidation protection system of claim 3, wherein the cubic boron nitride powder forms a greater weight percentage of the boron-glass layer than the boron carbide powder.

5. The oxidation protection system of claim 3, wherein at least one of the boron-glass layer or the silicon-glass layer includes monoaluminium phosphate.

6. The oxidation protection system of claim 3, wherein the first glass modifier comprises aluminum oxide, and wherein the second glass modifier comprises zirconium boride.

7. A method for forming an oxidation protection system on a carbon-carbon composite structure, comprising:
   applying a first pretreating composition to an outer surface of the carbon-carbon composite structure;
   heating the first pretreating composition;
   applying a second pretreating composition on the first pretreating composition, wherein the carbon-carbon composite structure is porous and the second pretreating composition penetrates a pore of the composite structure;
   applying a boron slurry to the carbon-carbon composite structure, wherein the boron slurry comprises a boron compound, a first glass compound, a first glass former, a first glass modifier, and a first carrier fluid, wherein the boron compound comprises a mixture of boron carbide powder and cubic boron nitride powder;
   applying a silicon slurry to the carbon-carbon composite structure, wherein the silicon slurry comprises a silicon compound, a second glass compound, a second glass former, a second glass modifier, and a second carrier fluid; and
   heating the carbon-carbon composite structure.

8. The method of claim 7, wherein the first glass modifier comprises at least one of a first alkaline earth metal compound, a first zirconium compound, or a first aluminum compound, and wherein the second glass modifier comprises at least one of a second alkaline earth metal compound, a second zirconium compound, or a second aluminum compound.

9. The method of claim 8, wherein the first glass modifier includes at least one of calcium boride, calcium oxide, calcium carbonate, magnesium boride, magnesium oxide, magnesium carbonate, zirconium boride, zirconium oxide, zirconium carbonate, or aluminum oxide, and wherein the second glass modifier includes at least one of calcium boride, calcium oxide, calcium carbonate, magnesium boride, magnesium oxide, magnesium carbonate, zirconium boride, zirconium oxide, zirconium carbonate, or aluminum oxide.

10. The method of claim 9, wherein the first pretreating composition comprises aluminum oxide and water.

11. The method of claim 9, wherein each of the first glass former and the second glass former comprises colloidal silica.

12. The method of claim 9, wherein the boron nitride powder forms a greater weight percentage of the boron slurry than the boron carbide powder.

13. The method of claim 12, wherein each of the first glass and the second glass comprises borosilicate glass.

14. The method of claim 7, wherein the second pretreating composition comprises an aluminum salt and at least one of a phosphoric acid or an acid phosphate salt.

15. A method for forming an oxidation protection system on a brake disk, comprising:
   applying a first pretreating composition to an outer surface of a non-wear surface of the brake disk, the first pretreating composition comprising aluminum oxide and water;

heating the first pretreating composition;

applying a second pretreating composition comprising an aluminum salt and at least one of a phosphoric acid or an acid phosphate salt on the first pretreating composition to the non-wear surface of the brake disk, wherein the non-wear surface of the brake disk is porous and the second pretreating composition penetrates a pore of the non-wear surface of the brake disk;

forming a boron slurry by mixing a boron compound, a first glass compound, a first glass former, a first glass modifier, and a first carrier fluid, wherein the boron compound comprises a mixture of boron carbide powder and cubic boron nitride powder;

applying the boron slurry over the non-wear surface of the brake disk;

forming a silicon slurry by mixing a silicon compound, a second glass compound, a second glass former, a second glass modifier, and a second carrier fluid;

applying the silicon slurry over the non-wear surface of the brake disk; and heating the brake disk at a first temperature.

16. The method of claim 15, further comprising drying the brake disk after applying the boron slurry to remove the first carrier fluid.

17. The method of claim 16, further comprising drying the brake disk after applying the silicon slurry to remove the second carrier fluid.

18. The method of claim 16, wherein drying the brake disk after applying the silicon slurry comprises heating the brake disk at a second temperature less than the first temperature.

19. The method of claim 18, wherein the first glass modifier includes at least one of calcium boride, calcium oxide, calcium carbonate, magnesium boride, magnesium oxide, magnesium carbonate, zirconium boride, zirconium oxide, zirconium carbonate, or aluminum oxide, and wherein the second glass modifier includes at least one of calcium boride, calcium oxide, calcium carbonate, magnesium boride, magnesium oxide, magnesium carbonate, zirconium boride, zirconium oxide, zirconium carbonate, or aluminum oxide.

20. The method of claim 19, wherein the first glass former and the second glass former each comprise colloidal silica.

* * * * *

UNITED STATES PATENT AND TRADEMARK OFFICE
CERTIFICATE OF CORRECTION

| | | |
|---|---|---|
| PATENT NO. | : 12,319,622 B2 | Page 1 of 1 |
| APPLICATION NO. | : 17/747816 | |
| DATED | : June 3, 2025 | |
| INVENTOR(S) | : Steven Poteet | |

It is certified that error appears in the above-identified patent and that said Letters Patent is hereby corrected as shown below:

In the Specification

Column 1, Line 64 - please delete formula "(A1O3)" and insert formula --($A1_2O3$)--
Column 2, Line 43 - please delete formula "(A1O3)" and insert formula --($A1_2O3$ )--
Column 3, Line 24 - please delete formula "(A1O3)" and insert the formula --($A1_2\ O3$)--

Signed and Sealed this
Nineteenth Day of August, 2025

Coke Morgan Stewart
*Acting Director of the United States Patent and Trademark Office*